UNITED STATES PATENT OFFICE.

LUCIEN LAVEDAN, OF NEW ORLEANS, LOUISIANA, ASSIGNOR OF ONE-HALF TO VICTOR A. RENDON, OF NEW YORK, N. Y.

PROCESS OF TREATING THE JUICES OF THE AGAVE-PLANT.

1,182,691.     Specification of Letters Patent.     Patented May 9, 1916.

No Drawing.     Application filed February 12, 1916. Serial No. 77,895.

*To all whom it may concern:*

Be it known that I, LUCIEN LAVEDAN, a citizen of the United States, and a resident of New Orleans, in the parish of Orleans and State of Louisiana, have invented a certain new and useful Improvement in Processes of Treating the Juices of the Agave-Plant, of which the following is a specification.

My invention relates to processes for treating the juices of the agave plant, more particularly to the production of alcohol from the *Agave Americana*, and it consists in the various steps hereinafter enumerated.

An object of my invention is to provide a process for so treating the juices of the agave plant that alcohol, syrup, or molasses can be successfully and profitably manufactured.

A further object of my invention is to provide a process which is particularly adapted to the treatment of the juices of the agave plant because it not only brings these juices into condition to be successfully used for the purposes described, but it prevents the spoiling or decomposition of the juices and thus renders it possible to keep them longer than could otherwise be done under the industrial conditions which prevail in warm countries in which the agave plant flourishes, such as Yucatan.

A further object of my invention is to provide a process for treating the juices of the agave plant which will bring these juices to such a condition that the subsequent steps taken in the manufacture of the various products, such as alcohol, syrup, or molasses, are rendered extremely simple, thereby insuring an economical product.

Other objects and advantages will appear in the following specification, and the novel features of the invention will be particularly pointed out in the appended claims.

Hitherto the efforts to produce readily fermentable sugar of the agave plant juice in its natural condition, such as the juice from the *Agave Sisalensis* or *Agave Americana*, have not been successful. The reason for this is that these plants contain in their natural condition, not only a low percentage of naturally fermentable sugar, but also a high percentage of gummy, resinous, albuminous, and other noxious vegetable organic matter. The high organic acidity of the juice favors pectic, butylic, acetic fermentation, thereby preventing the proper propagation of the yeast. Moreover, a large percentage of the gum and albuminoids are of such a very tenuous condition and of such a high solubility at points above 80° Fahrenheit in water as well as in high wines or distillates, that they are carried along with the alcoholic vapors in the distilling apparatus, making the subsequent rectification of the alcohol very difficult as well as the separation of the impurities.

The purpose of my invention, generally stated, is to overcome the objections stated above.

The juice of the agave plant as stated is of a high organic acidity, and in order to most successfully carry out the process, I first neutralize the supply of juice preferably with carbonate of soda. Lime should not be used, since it will form with the organic acid of the juice a compound which would interfere with the subsequent operation. The neutralized juice should have a slight alkaline reaction. The juice is now boiled and during the boiling is treated with sulfur dioxid which is allowed to pass through the boiling mass, this operation being conducted in open vessels. The use of the sulfur dioxid gas leads to a number of important results: (A) it inverts and saccharifies; (B) it bleaches the juice; (C) it sterilizes the juice thereby preventing decomposition during the process of boiling or evaporating the juice for the manufacture of syrup or molasses; (D) with a normal sulfuration and subsequent neutralization, it will give a sugar solution having just a sufficient alkalinity to further successfully evaporate the same, if syrup or molasses are to be manufactured, or to add in the sugar solution just a normal amount of sulfuric acid used in a normal alcoholic fermentation; (E) by sulfurating the agave juice, the action of the sulfurous acid in the same permits the keeping or storing of the juice without deterioration, for otherwise it would quickly deteriorate especially in the warm countries where the agave plant flourishes and where these operations are likely to be carried out. The action of the heat and the gas causes a breaking up of the gummy, resinous coloring matter and coagulates the albuminoids. These impurities tend to form a scum or blanket which mechanically removes much of the other impurities of the juice and largely assists in the clarifying of the juice. This scum or froth is skimmed off from time to time. The sulfurated liquid is now neutralized with sufficient lime to bring the juice to a slight alkalinity, stirring the same well during the addition of the lime until the red and blue litmus paper test shows that the color of both remains unchanged. My experiments have shown me the necessity of being very careful in the matter of the neutralization of the agave juice. Of course the quantity of lime which is necessary varies according to the character of the juice and the quantity of the sulfur dioxid added. After neutralization the juice is allowed to settle down and to cool until it reaches a temperature of about 60° centigrade, when it is decanted, that is to say, it is drawn off from the surface downward, thus securing a good separation of the settling from the free liquor. The latter is filtered through filter presses and after being cooled down to the proper temperature is ready to be set with the proper amount of pure selected and acclimated yeast to a normal alcoholic fermentation.

I am aware that the use of sulfur dioxid in the sulfuration of cane sugar juices is common in the manufacture of sugar, but it has never been used, to my knowledge, in the preparation of agave juice (as well as of any other raw material) to prepare the same for the subsequent alcoholic fermentation. Besides, I desire to call attention to the fact that in the juices of the agave plant, the sulfurous acid has several functions. In the agave juice the breaking up of the gummy resinous matter, the preventation of the coloration and decomposition of the liquid, the sterilization of the liquid which permits its being kept or stored, and the bleaching effect, are essential to the carrying out of the process, as well as the inverting action which brings the juice into a readily fermentable condition.

During the inversion or saccharification of the agave juice by using sulfur dioxid and boiling the same a certain amount of sulfuric acid is formed, which saccharifies a certain amount of dextrin and other gummy substances which otherwise are lost as far as the production of alcohol is concerned, when the agave juice is set into alcoholic fermentation, without this preliminary treatment of the agave juice.

I claim:—

1. The herein described steps in the process of treating the juice of the agave plant, which consist in boiling the juice and treating the boiling juice with sulfurous acid.

2. The herein described steps in a process of treating the juice of the agave plant, which consist in breaking up the gummy resinous coloring matters of the juice, and simultaneously coagulating the albuminoids of the juice by boiling the juice and simultaneously treating it with sulfurous acid, whereby a scum or froth is formed on the top of the juice, and subsequently skimming off the froth or scum.

3. The herein described steps in a process of treating the juice of the agave plant, which consist in neutralizing the normally acid juice to slight alkalinity, boiling the neutralized juice with sulfurous acid whereby a scum or froth is formed, and skimming off the scum or froth.

4. The herein described steps in a process of treating the juice of the agave plant, which consist in neutralizing the normally acid juice to slight alkalinity with carbonate of soda, boiling the neutralized juice with sulfurous acid whereby a scum or froth is formed, and skimming off the scum or froth.

5. The herein described steps in a process of treating the juice of the agave plant, which consist in neutralizing the normally acid juice to slight alkalinity, boiling the neutralized juice with sulfurous acid whereby a scum or froth is formed, skimming off the scum or froth, and permitting the neutralized liquid to settle.

6. The herein described steps in a process of treating the juice of the agave plant, which consist in neutralizing the normally acid juice to slight alkalinity, boiling the neutralized juice with sulfurous acid whereby a scum or froth is formed, skimming off the scum or froth, permitting the neutralized liquid to settle, and subsequently decanting the settled liquid and filtering the decanted portion.

LUCIEN LAVEDAN.